(No Model.)
W. H. DETTER.
VEHICLE WHEEL.
No. 515,904. Patented Mar. 6, 1894.
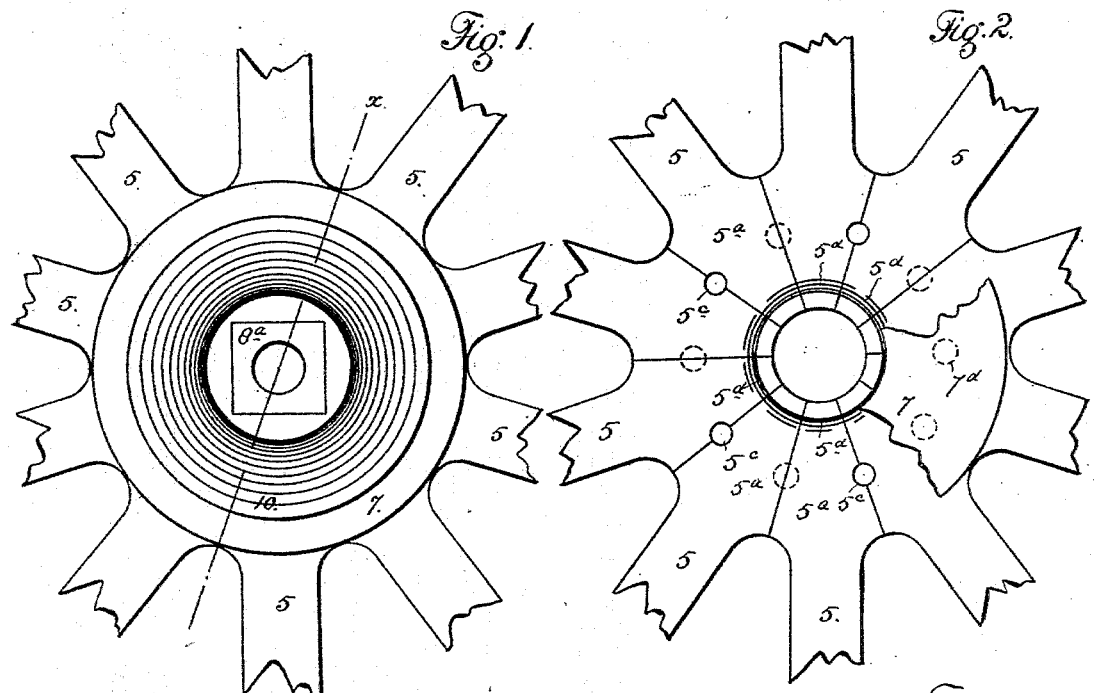
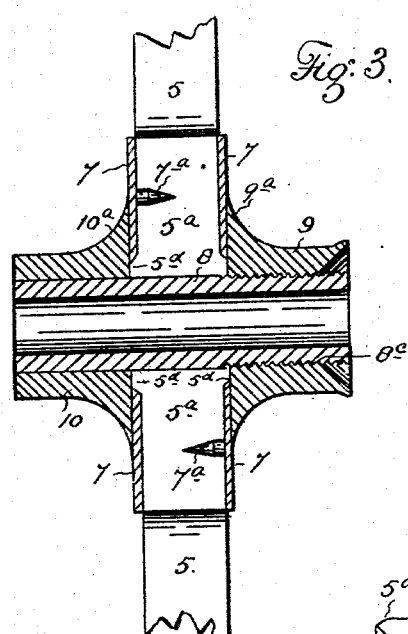
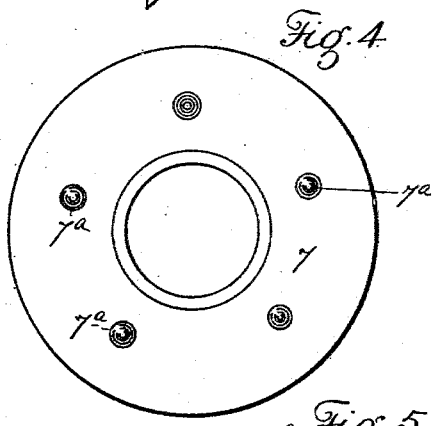
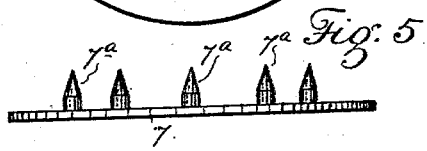
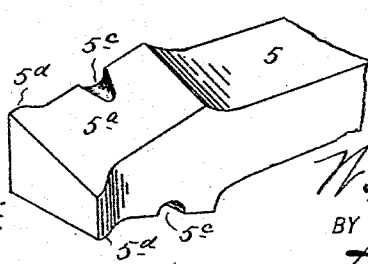
WITNESSES:
INVENTOR
W. H. Detter
BY
A. J. O'Brien
ATTORNEY.

UNITED STATES PATENT OFFICE.

WILLIAM H. DETTER, OF DENVER, COLORADO.

VEHICLE-WHEEL.

SPECIFICATION forming part of Letters Patent No. 515,904, dated March 6, 1894.

Application filed March 13, 1893. Serial No. 465,833. (No model.)

*To all whom it may concern:*

Be it known that I, WILLIAM H. DETTER, a citizen of the United States of America, residing at Denver, in the county of Arapahoe and State of Colorado, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in vehicle wheels and the same consists of the features, arrangements and combinations hereinafter described and claimed, all of which will be fully understood by reference to the accompanying drawings, in which is illustrated an embodiment thereof.

In the drawings, Figure 1 is a side view of the wheel, showing the outer extremity of the hub. Fig. 2 illustrates the spokes detached from the hub, a fragment of one of the bradded washers being shown in place. Fig. 3 is a section taken on the line $x$—$x$, Fig. 1. Fig. 4 is a face view of one of the bradded washers. Fig. 5 is an edge view of the same. Fig. 6 is a perspective view of the inner extremity of one of the spokes.

Similar reference characters indicating corresponding parts or elements of the mechanism in the several views let the numeral 5 designate the spokes having wedge-shaped extremities $5^a$ provided with recesses $5^c$ for the reception of the brads $7^a$ of the washers 7 which engage the spoke extremities on either side as shown in Fig. 3. The inner extremities of these spokes are provided with lugs $5^d$ which project outwardly and engage the inner edge of the washers. This feature prevents the removal of the spokes by an outward pull from the hub and supplements the brads of the washers in retaining the spokes securely in place. The inner extremities of the spokes butt against the metal box 8, which is square at its outer extremity as shown at $8^a$, while its inner portion is threaded exteriorly as shown at $8^c$ to receive the interiorly threaded hub-section 9. The outer hub section 10 is exteriorly recessed to receive the angular extremity $8^a$ of the box whereby the latter is held fast in the hub and locked from rotary movement. The hub-sections 9 and 10 are enlarged at their inner extremities to form flanges $9^a$ and $10^a$ which engage the washers and lock the same securely in place. It will thus be seen that the parts of the wheel are readily detachable whereby in case the spokes becomes "dished" sufficiently to weaken the wheel, the latter may be taken off and turned so that the spokes shall project outwardly instead of inwardly from the hub, in which position they may be kept until the excessive dishing is overcome. In changing or reversing the wheel on the axle in the manner just described, it is only necessary to reverse the position of the box as well as the hub sections, so that the hub section 10 and the corresponding extremity of the box shall always be on the outside.

Having thus described my invention, what I claim is—

In a vehicle wheel, the combination of the spokes having enlarged, wedge-shaped inner extremities butting against the box and projecting laterally in opposite directions, the flat washers surrounding the lateral projections of the enlarged spoke ends and locking the spokes in place, the washers being provided on their inner surfaces with pointed brads which enter recesses formed in the spokes on opposite sides, the box being formed angular in cross-section at one extremity, and exteriorly threaded at its opposite extremity, and the separate hub sections enlarged interiorly to engage the washers, the outer section having a counterpart recess adapted to receive the outer extremity of the box while the inner section is threaded to engage the inner extremity of the box, substantially as described.

In testimony whereof I affix my signature in presence of two witnesses.

WILLIAM H. DETTER.

Witnesses:
 W. D. SAXTON,
 T. E. CARICO.